(12) United States Patent
Thompson

(10) Patent No.: US 8,875,346 B2
(45) Date of Patent: Nov. 4, 2014

(54) HINGE ASSEMBLY FOR EYEWEAR

(75) Inventor: Jonathan Thompson, Corona, CA (US)

(73) Assignee: Oakley, Inc., Foothill Ranch, CA (US)

( * ) Notice: Subject to any disclaimer, the term of this patent is extended or adjusted under 35 U.S.C. 154(b) by 67 days.

(21) Appl. No.: 13/171,290

(22) Filed: Jun. 28, 2011

(65) Prior Publication Data

US 2013/0000077 A1    Jan. 3, 2013

(51) Int. Cl.
*G02C 5/22*    (2006.01)

(52) U.S. Cl.
CPC .......... *G02C 5/2209* (2013.01); *G02C 2200/18* (2013.01)
USPC ............................................. 16/228; 351/153

(58) Field of Classification Search
CPC .......... G02C 5/22; G02C 5/2209; F16B 19/06
USPC ............. 16/228, 273; 351/121, 153; 411/501, 411/508, 913, 338
See application file for complete search history.

(56) References Cited

U.S. PATENT DOCUMENTS

| | | | |
|---|---|---|---|
| 2,366,965 A * | 1/1945 | Johnson ........................ 411/15 |
| 2,774,098 A * | 12/1956 | Tieri .............................. 16/228 |
| 2,828,668 A * | 4/1958 | De Angelis ................... 351/109 |
| 2,868,668 A | 5/1958 | Angelis |
| 2,947,024 A | 8/1960 | Czudak |
| 3,042,961 A * | 7/1962 | Tieri .............................. 16/228 |
| 3,064,530 A * | 11/1962 | Vigano ......................... 351/121 |
| 3,110,057 A | 11/1963 | Urich |
| 3,396,425 A * | 8/1968 | Metcalfe ........................ 16/228 |
| 3,593,365 A * | 7/1971 | Amundsen ..................... 16/228 |
| 3,826,565 A * | 7/1974 | Wenzel .......................... 351/121 |
| 3,837,735 A * | 9/1974 | Guillet .......................... 351/113 |
| 3,957,360 A * | 5/1976 | Villani .......................... 351/113 |
| 4,244,081 A * | 1/1981 | Beyer et al. .................... 16/228 |
| 4,268,130 A | 5/1981 | Vinocur |
| 4,269,026 A | 5/1981 | Bulle et al. |
| 4,524,486 A | 6/1985 | Rios et al. |
| 4,726,092 A * | 2/1988 | Tacheny et al. ................ 16/364 |
| 4,832,479 A * | 5/1989 | Beyer et al. ................... 351/153 |
| 5,224,248 A * | 7/1993 | Brilliant ......................... 29/20 |
| 5,517,723 A | 5/1996 | Sircy |
| 5,627,608 A * | 5/1997 | Chao ............................ 351/113 |
| 5,815,899 A * | 10/1998 | Chao .............................. 29/20 |

(Continued)

FOREIGN PATENT DOCUMENTS

EP    266307 A  *  5/1988
EP    992831 A1 *  4/2000

(Continued)

OTHER PUBLICATIONS

International Search Report and Written Opinion for International Application No. PCT/US12/43297, filed Jun. 20, 2012, dated Oct. 22, 2012.

*Primary Examiner* — Victor Batson
*Assistant Examiner* — Jason W San
(74) *Attorney, Agent, or Firm* — Knobbe Martens Olson & Bear LLP

(57) ABSTRACT

A hinge assembly for an eyeglass frame is provided. The hinge assembly can be configured to provide support to the earstems of the eyewear frame when the earstems are rotated between a folded and unfolded position. In some embodiments, the hinge assembly can provide a screwless appearance and improved engagement and articulation of the earstem relative to the frame of the eyeglass.

16 Claims, 9 Drawing Sheets

(56) References Cited

U.S. PATENT DOCUMENTS

| | | | |
|---|---|---|---|
| 5,867,870 A * | 2/1999 | Kluting | 16/254 |
| 5,889,575 A * | 3/1999 | Wang | 351/113 |
| 6,163,926 A * | 12/2000 | Watanabe | 16/228 |
| 6,210,004 B1 * | 4/2001 | Horikawa et al. | 351/153 |
| 6,393,664 B1 * | 5/2002 | Habegger et al. | 16/335 |
| 6,481,053 B2 * | 11/2002 | Desbiez-Piat | 16/228 |
| 6,494,574 B2 | 12/2002 | Ebata | |
| 6,623,115 B1 * | 9/2003 | Kun-Yuan | 351/153 |
| 6,721,991 B2 * | 4/2004 | Dioguardi | 16/228 |
| 6,751,841 B2 * | 6/2004 | Schnabel et al. | 29/524.1 |
| 6,814,438 B2 * | 11/2004 | Desbiez-Piat | 351/153 |
| 6,877,204 B1 * | 4/2005 | Schnabel et al. | 29/512 |
| 6,910,247 B1 * | 6/2005 | Tabacchi | 16/228 |
| 6,916,093 B2 * | 7/2005 | Quehin | 351/153 |
| 7,380,935 B2 * | 6/2008 | Ifergan | 351/153 |
| 7,455,402 B2 | 11/2008 | Gerber et al. | |
| 7,516,534 B2 * | 4/2009 | Easterbrook et al. | 29/509 |
| 7,775,658 B2 * | 8/2010 | Antoniacomi | 351/113 |
| 7,794,080 B2 * | 9/2010 | Zelazowski | 351/153 |
| 8,177,360 B2 * | 5/2012 | Sierra et al. | 351/153 |
| 8,192,017 B2 * | 6/2012 | Chen | 351/153 |
| 8,256,894 B2 * | 9/2012 | Ifergan | 351/153 |
| 2003/0020867 A1 * | 1/2003 | Dei Negri et al. | 351/153 |
| 2005/0078272 A1 * | 4/2005 | Quehin | 351/153 |
| 2012/0240350 A1 * | 9/2012 | Natu et al. | 16/2.2 |
| 2013/0000077 A1 * | 1/2013 | Thompson | 16/228 |

FOREIGN PATENT DOCUMENTS

| | | | | |
|---|---|---|---|---|
| EP | 1564579 A1 * | 8/2005 | | G02C 5/08 |
| FR | 2769996 | 4/1999 | | |
| FR | 2838530 A1 * | 10/2003 | | |

* cited by examiner

HINGE ASSEMBLY FOR EYEWEAR

BACKGROUND

1. Field of the Inventions

The present disclosure generally relates to eyewear, and more particularly, to a hinge assembly for eyewear.

2. Description of the Related Art

Eyewear generally includes a front portion with a pair of optical lenses or optical zones on opposing sides of a nose bridge. A nosepiece may comprise a pair of bilaterally symmetrical nose pads, generally supported by a frame, which typically extend medially (inwardly) and/or in a posterior direction from opposing medial sides of the nose bridge to help support the eyeglasses on a wearer's nose. A pair of earstems typically extends in a posterior (rearward) direction from the front portion. The earstems are typically attached to the front portion with a hinge assembly with a screw that allows the earstems to pivot between a folded (closed) and unfolded (open, as-worn) position.

SUMMARY

The present disclosure generally relates to eyewear, and more particularly, to a hinge assembly for an eyeglass frame configured to be used without a screw, avoiding loosening or loss of the screw and reducing stress associated with the engagement between the screw and the eyeglass frame. Embodiments of the hinge assembly described herein can provide additional support to the earstems while folding or unfolding the earstems to or from an as-worn position.

One embodiment provides a screwless hinge for eyewear. The screwless hinge comprises a hub and a first rotational element configured to receive the hub. The first rotational element is configured to attach to an earstem. The screwless hinge further comprises a second rotational element configured to receive the hub. The second rotational element is configured to attach to a front portion of an eyewear frame or lens. The first rotational element and the second rotational element are pivotable with respect to each other about the hub when the first rotational element and the second rotational element receive the hub. The hub comprises first and second retaining portions configured at its opposed ends, the retaining portions configured to axially retain the hub with respect to the first and second rotational elements. The first retaining portion comprises a first flange extending radially outwardly from a first end of the hub. The first flange comprises a tapered or radiused portion configured to engage with a corresponding tapered or radiused portion on at least one of the first and second rotational elements such that the first end of the hub is seated adjacent to or against at least one of the ear stem and the front portion when the first rotational element and second rotational element receive the hub. For example, in some embodiments, the first end of the hub can be proud, flush, or recessed with respect to at least one of the earstem and the front portion when the first rotational element and second rotational element receive the hub.

In some embodiments, the screwless hinge may further comprise a biasing mechanism supported by the earstem. The biasing mechanism is configured to apply a force against the second rotational element to provide a rotational resistance between the first and second rotational elements when the first and second rotational elements pivot with respect to each other. In some embodiments, the biasing mechanism can comprise a resilient element that acts against a biasing surface to provide an increasing degree of resistance to hyperextension of the earstem from the open or folded position. Alternatively, the resilient element can act against the biasing surface to provide a decreasing or steady degree of resistance to hyperextension. The biasing surface can comprise one or more notches having constant or varied depths and configurations so as to provide a desired articulation. Further, the biasing surface can be configured as a generally concave, flat, and/or convex surface. This regard, the biasing surface can be configured with a geometry that achieves a desired articulation of the earstem and interaction of the components of the biasing mechanism.

In some embodiments, the hub can comprise a tubular body with a sidewall extending between a pair of openings to form an inner hub channel. An inner perimeter of the sidewall can comprise an approximately circular cross-sectional shape.

In some embodiments, an outer perimeter of the hub can comprise an approximately circular cross-sectional shape.

In some embodiments, the screwless hinge can further comprise a third rotational element configured to attach to the earstem or the front portion and to receive the hub. The third rotational element can be configured to attach to the earstem such the second rotational element can be positioned between the first and third rotational element. The biasing mechanism can be supported by a portion of the earstem between the first and third rotational element.

In some embodiments, the screwless hinge can further comprise the earstem. An earstem channel can extend distally from a proximal end of the earstem, the earstem channel configured to receive the biasing mechanism.

In some embodiments, the biasing mechanism can further comprise a spring.

In some embodiments, the screwless hinge can further comprise the eyewear frame and the lens.

In some embodiments, the second retaining portion can comprise a second flange extending radially outwardly from a second end of the hub.

In some embodiments, the second retaining portion can comprise a burr extending radially outwardly from the second end of the hub.

In some embodiments, the second rotational element can comprise a stop configured to engage with a distal end of the biasing mechanism. The stop can define an open or folded position of the earstem with respect to the front portion. The second rotational element can further comprise a cam configured to guide the biasing mechanism along a surface of the second rotational element to the stop. The stop can comprises a notch extending into a surface of the second rotational element. The distal end of the biasing mechanism can comprise a ball bearing.

The hub can be configured to be rotationally fixed with respect to one of the first and second rotational elements when the hub is received by the first and second rotational elements.

Another embodiment provides a screwless hinge for eyewear. The screwless hinge comprises a hub and a first rotational element configured to receive the hub. The first rotational element is configured to attach to one of an earstem and a front portion of an eyewear frame or lens. The screwless hinge further comprises a second rotational element configured to receive the hub. The second rotational element is configured to attach to the other of an earstem and a front portion of an eyewear frame or lens. The first rotational element and the second rotational element are pivotable with respect to each other about the hub when the first rotational element and the second rotational element receive the hub. The hub comprises a first retaining portion configured to retain the first and the second rotational elements with respect to each other when the hub is received by the first and the second rotational elements. The first retaining portion comprises a first flange configured to extend radially outwardly from a first end of the hub. The first flange comprises a tapered or radiused portion configured to engage with a corresponding tapered or radiused portion on the first rotational element such that the first end of the hub such that the first end of the hub is seated adjacent to or against an outer surface of the first rotational element when the first rotational element receives the hub. For example, in some embodiments, the first end of the hub can be proud, flush, or recessed with respect to the outer surface of the first rotational element when the first rotational element receives the hub.

In some embodiments, the screwless hinge can further comprise a resistance element configured to provide a rotational resistance between the first and second rotational elements when the first and second rotational elements pivot with respect to each other.

In some embodiments, the hub can further comprise a second retaining portion configured to retain the first and the second rotational elements with respect to each other when the hub is received by the first and the second rotational elements. The second retaining portion can comprise a second flange extending radially outwardly from a second end of the hub.

In some embodiments, the hub can further comprise a burr extending radially outwardly from a second end of the hub.

In some embodiments, the hub can further comprise a second retaining portion configured to retain the first and the second rotational elements with respect to each other when the hub is received by the first and the second rotational elements. The second retaining portion can comprise a portion of the hub configured to frictionally engage with at least one of the first and the second rotational elements.

In some embodiments, an outer perimeter of the hub comprises a substantially circular cross-sectional shape.

In some embodiments, the screwless hinge further comprises a third rotational element configured to attach to the earstem or the front portion and to receive the hub. The first and the third rotational elements can be configured such the second rotational element can be positioned within a gap extending between the first and third rotational element, wherein the resistance element is positioned between the first and third rotational element.

In some embodiments, the hub can comprise a tubular body with a sidewall extending between a pair of openings to form an inner hub channel. An inner perimeter of the sidewall can comprise an approximately circular cross-sectional shape.

In some embodiments, the screwless hinge further comprises the earstem, the eyewear frame, and the lens. The earstem can include an earstem channel extending distally from a proximal end of the earstem. The earstem channel can be configured to receive the resistance element.

In some embodiments, the resistance element can further comprise a spring.

In some embodiments, the second rotational element can comprise a first stop configured to engage with a distal end of the resistance element, the first stop can define an open or folded position of the earstem with respect to the front portion. The second rotational element can further comprise a cam path configured to guide the biasing mechanism to the stop along a surface of the second rotational element. The first stop can comprise a notch in a surface of the second rotational element. The distal end of the resistance element can comprise a ball bearing.

In some embodiments, the hub can be configured to be rotationally fixed with respect to one of the first and second rotational elements when the hub is received by the first and second rotational elements.

The resistance element can comprise a surface of at least one of the hub, the first rotational element and the second rotational element. The surface can be configured to frictionally engage with a corresponding surface of at least one of the other of the hub, the first rotational element and the second rotational element.

In yet other embodiments, a method is provided for manufacturing a screwless hinge for eyewear. The method provides a first rotational element attached to an earstem, the first rotational element comprising a first channel configured to receive a hub. The method further provides a second rotational element attached to a front portion of an eyewear frame or lens, the second rotational element comprising a second channel configured to receive the hub. A resistance element is supported with the earstem such that the resistance element applies a force against the second rotational element to provide a rotational resistance between the first and the second rotational element when the first and the second rotational element are rotated with respect to each other about a pivot axis. The first rotational element and the second rotational element are positioned to be substantially aligned about the pivot axis. The hub is positioned such that it is received by the first and second channels.

In some embodiments, the resistance element can be inserted into a third channel extending distally from a proximal end of the earstem.

In some embodiments, a flange can be formed in an end of the hub. The flange can be engaged with a corresponding surface of the first rotational element.

In some embodiments, a first hub portion can be inserted into a first end of at least one of the first and second channels in a first direction, and a second hub portion can be inserted into a second end of at least one of the first and second channels in a second direction, wherein the second direction is approximately opposite to the first direction. In some embodiments, the first and second hub portions can be connected to each other.

BRIEF DESCRIPTION OF THE DRAWINGS

The appended drawings are meant to illustrate and not to limit the present inventions, and in which.

DETAILED DESCRIPTION

Figure 1:
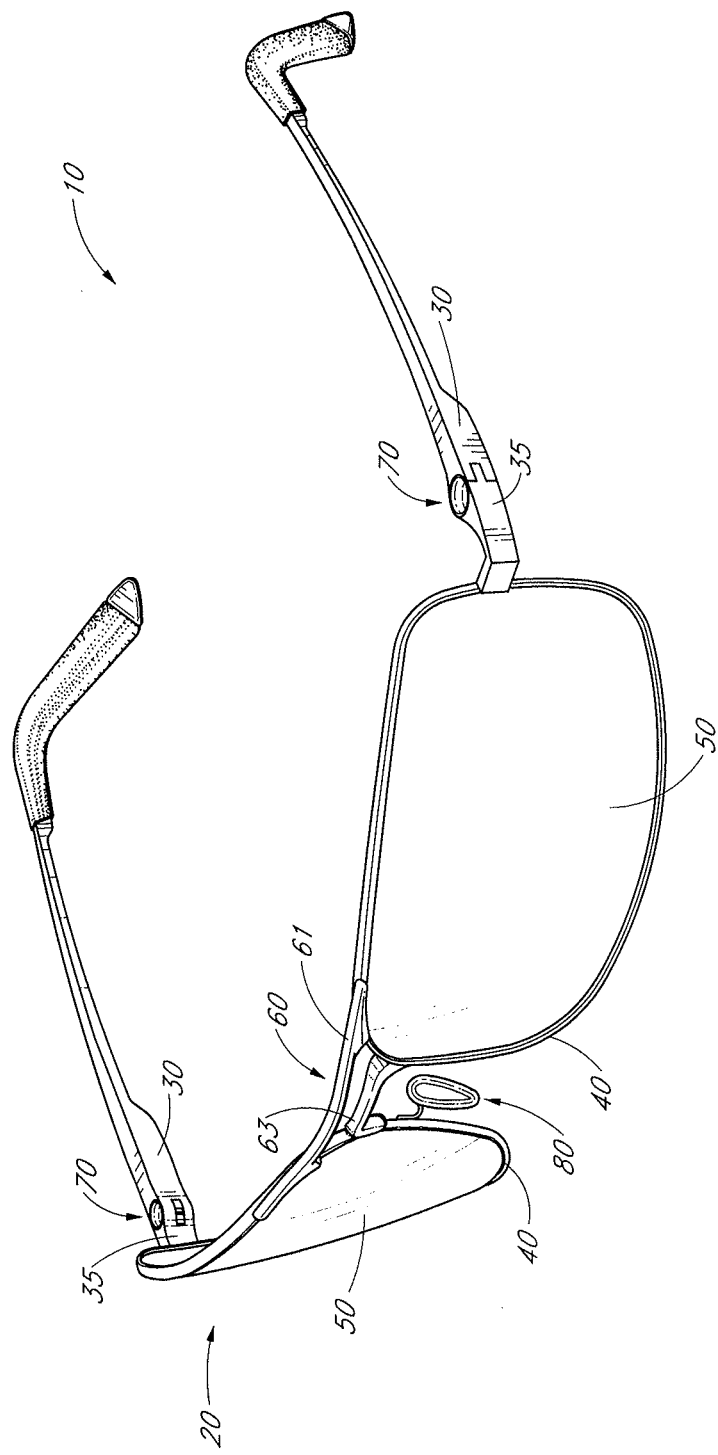
FIG. 1 is a front and left side perspective view of an embodiment of an eyewear with a screwless hinge assembly.

There are many different forms of eyewear, including eyeglasses, shields, goggles, etc. There are also many different forms of eyeglasses, including corrective or prescription eyeglasses, sunglasses, plano eyeglasses, dual lens eyeglasses, unitary lens eyeglasses, glass lens eyeglasses, polymer lens eyeglasses, framed eyeglasses, frameless eyeglasses, etc.

In accordance with some embodiments disclosed herein, eyewear, such as an eyeglass can be provided that includes a front portion with left and right orbitals which support a pair of plano or ophthalmic optical lenses on opposing sides of a nose bridge. A nosepiece can be provided that extends medially (e.g., inwardly) and/or in a posterior (e.g., rearwardly) direction from opposing sides of the orbitals under the nose bridge to help support the eyeglasses on a wearer's nose. A pair of earstems can be rotatably connected to and extend in a posterior direction from the front portion with a screwless hinge assembly, to facilitate movement of the earstems between a closed (e.g., stowed or folded) and an open (e.g., deployed, unfolded, or as-worn) position. However, it is also contemplated that embodiments can also be provided that are not eyeglasses or that do not incorporate a lens or lenses.

In some embodiments, the eyewear can comprise a screwless hinge assembly. The screwless hinge assembly can comprise one or more rotational elements that is configured to attach earstems to the eyeglass frame (e.g., a temple). The rotational elements can comprise one or more components.

In some embodiments, the rotational element can receive a hub, around which the rotational element can rotate. The hub can eliminate the hinge screw used to attach the earstems to the frame in conventional eyewear. Conventional hinge screws can loosen during use, increasing the risk of screw loss and disengagement of the earstems from the remainder of the eyewear frame. Such screws also require corresponding threads positioned on the eyeglass frame, reducing the strength of the frame. Conventional hinge screws are also limited to certain material and plating options, and thus are prone to corrosion. Additionally, the installation and removal of conventional hinge screws can be difficult, in particular, due to their small size.

In some embodiments, the hub can be a larger diameter than a conventional hinge screw and/or can include additional retaining portions providing increased support between the earstems and the eyeglass frame. Embodiments of the hub and the rotational elements on the frame with which the hub engages can reduce rotation of the earstems about a longitudinal axis relative to the temple (e.g., "temple rocking"). The hub can provide additional material options than a conventional hinge screw. Some embodiments of a screwless hinge assembly described herein can also be easier to manufacture and assemble, and will not loosen or disengage during extended use of the eyewear. Additionally, the screwless hinge assembly described herein can provide a certain aesthetic appeal over a traditional eyeglass hinge using a screw.

In some embodiments, the screwless hinge assembly comprises a resistance element supported by the earstem. The resistance element can be supported within a channel extending distally from a proximal end of the earstem. The resistance element can apply a force to the rotational element attached to the temple, to provide a rotational resistance between the earstem and the remainder of the eyeglass frames when the earstems are folded and unfolded.

FIG. 1 is a front and left side perspective view of an embodiment of an eyeglass frame 10. The structures and steps disclosed herein can be used or applied to any type of eyewear, such as eyeglass and/or goggles. The eyeglass frame 10 can include a front portion 20 and a pair of earstem portions 30 for retaining the eyeglass on the head of the wearer. The front portion 20 can include at least one lens support 40. In some embodiments, the front portion 20 can include a pair of lens supports. Further, the lens support 40 can comprise one or more orbitals, which can be configured to support a pair of optical zones or lenses 50. The front portion 20 can also include a nose bridge 60 comprising one or more members extending between opposing inward, or medial sides of the lens support 40. The nose bridge 60 is shown with two generally horizontal nose bridge members 61, 63 extending between opposing medial sides of the lens support 40, and proximate to a superior (e.g., upper) portion of the lens support 40. In some embodiments, the eyewear can comprise a single strut or a nose bridge integrated as part of the frame, lens support, lenses 50, etc.

In the illustrated embodiment, the lens support 40 is shown as a pair of orbitals that completely surround the lenses 50 for exemplary purposes only. The orbitals may alternatively only partially surround the lenses, such as in embodiments in which a support extends along only a lower or upper portion of the lenses, or in rimless eyeglass frames, in which the earstems and/or the nose bridge are mounted directly to the lenses, without orbitals. Additionally, although the illustrated eyeglass frame 10 includes a pair of orbitals supporting a pair of optical lenses 50, other arrangements are possible wherein a single, unitary lens extends across both the wearer's left and right eye lines of sight.

A nosepiece 80 can be permanently or removably attached to the lens support, frame, lenses, etc. to support the eyeglass on the nose of a wearer. The nosepiece 80 can attach to opposing medial portions of each of the lens support 40, and in some embodiments, inferior to (e.g., below) the nose bridge 60. In some embodiments, a nosepiece can attach to various portions of frame 10, including the lens support 40, nose bridge 60, lenses 50, and/or any intermediate support structure, etc.

Each of the earstem portions 30 can be permanently or removably attached to various portions of the frame, lens support, lenses, etc., to retain the eyeglass on the head of the wearer. Each of earstem portions 30 can be attached to a superior, inferior, or lateral (e.g., outer) portion of the lens support 40. In some embodiments, the front portion 20 can comprise an optional intermediary structure, such as a pair of temples 35, attached to a portion of the lens support 40, to which the earstem portions 30 can be attached.

Each of the earstem portions 30 can extend in a posterior direction from its point of attachment to frame 10. For example, the earstem portions 30 can be attached to the opposed lateral edges of the lens support 40 and extend rearwardly or posteriorly therefrom. Each of the earstem portions 30 can include a portion that extends in an anterior (e.g., forward) direction from its point of attachment to frame 10. Each of the earstem portions 30 can extend laterally or medially from its point of attachment to frame 10. The earstem portions 30 can be permanently or removably attached to eyeglass frame 10. The earstem portions can be separately formed, or integrally formed with various portions of frame 10, including any of the lens support 40, nose bridge 60, lenses 50, and/or any intermediate support structure. The front portion 20, nosepiece 80, lens support 40, lenses 50 and earstems 30 can comprise any of many different shapes, sizes, materials and configurations. Injection molding, stamping, forging, casting, machining, and other construction techniques for these components can be used.

Figure 7A:
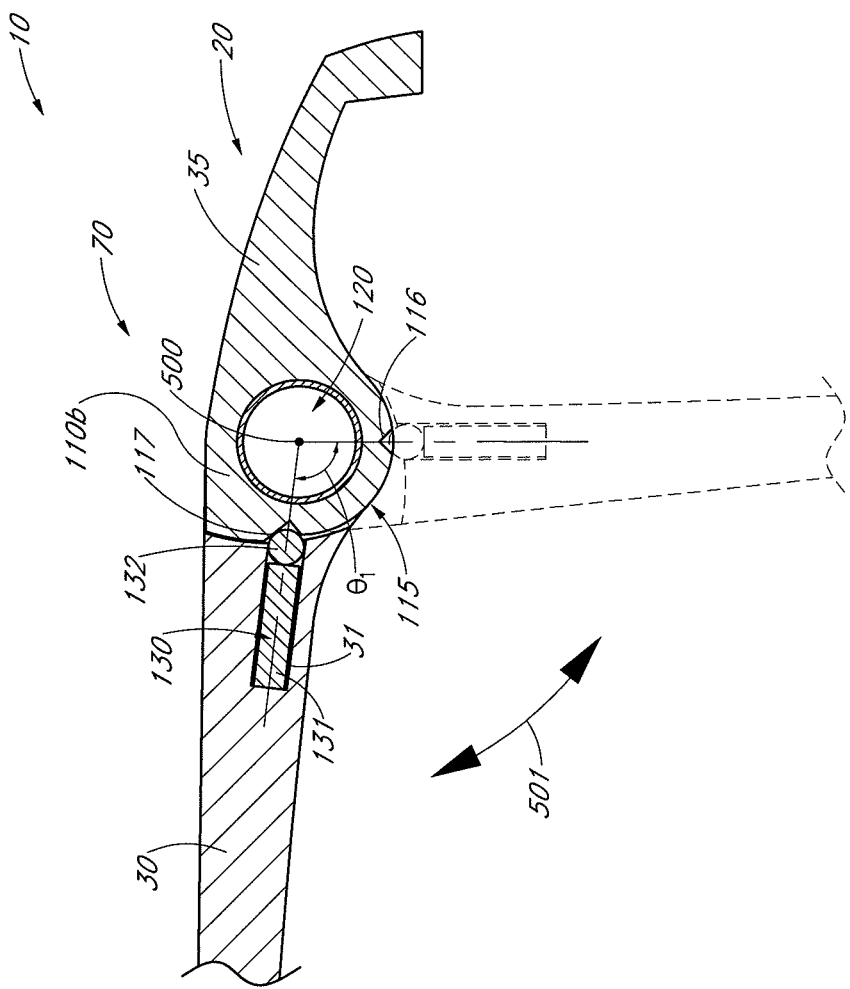
FIG. 7A is a partial top cross-sectional view of an embodiment of a hinge assembly for eyewear taken along line 7-7 of FIG. 5.
Figure 7B:
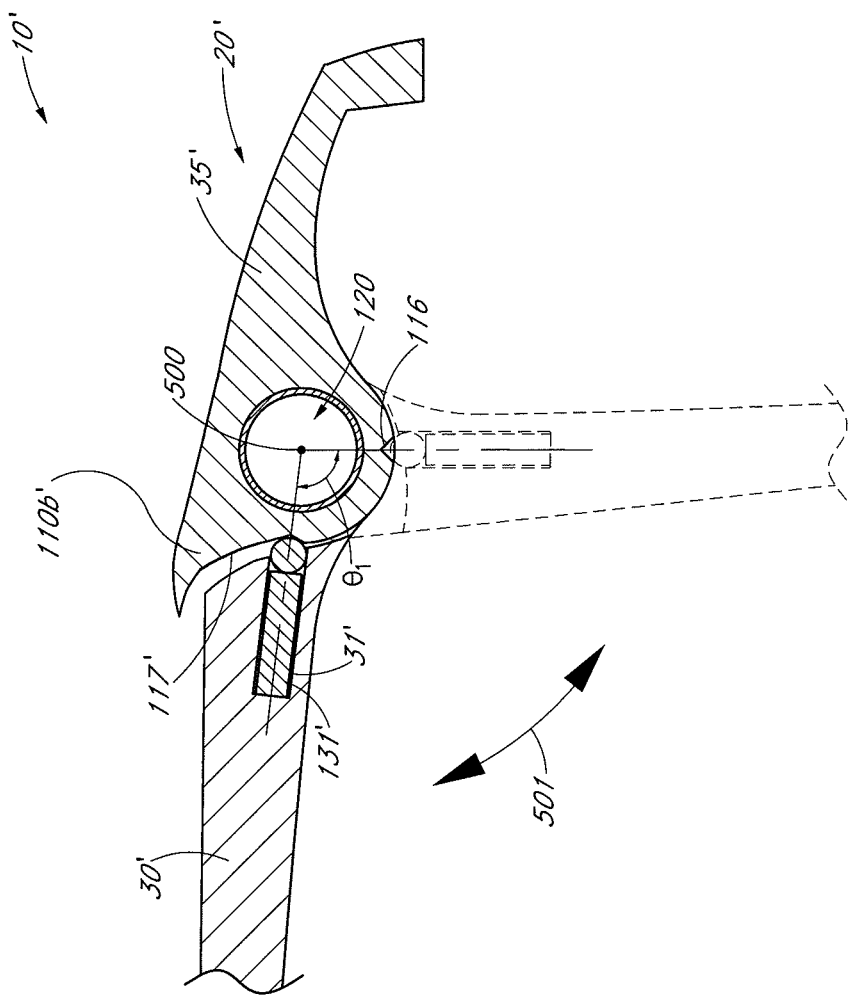
FIG. 7B is a partial top cross-sectional view of another embodiment of the hinge assembly, similar to that shown in FIG. 7A.

In some embodiments, each earstem 30 can be connected to the front portion 20 by a hinge 70, to facilitate movement of earstem 30 between a folded position and an open position relative to the front portion 20. FIGS. 7A-B show embodiments of eyeglass frame 10 in an open position (solid lines) and in a folded position (hidden lines). Referring again to FIG. 1, in some embodiments, hinge 70 comprises a screwless hinge assembly, as described further herein. The embodiments of the earstems 30 are described herein in the context of eyeglass frames for exemplary purposes only, and can be employed in other types of eyewear.

Figure 2:
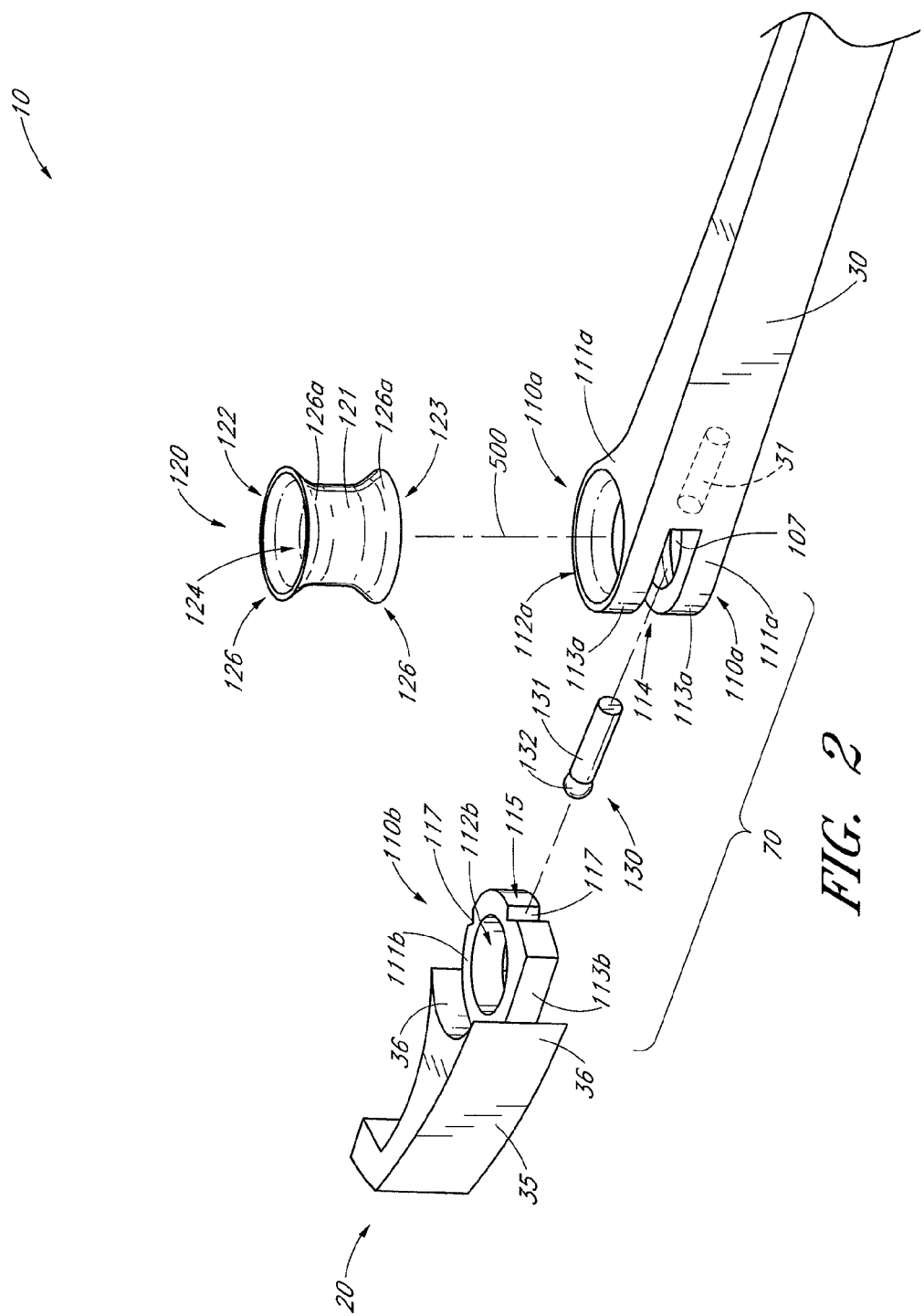
FIGS. 2 and 3 are enlarged, exploded, opposing side perspective views of an embodiment of a screwless hinge assembly for eyewear.
Figure 3:
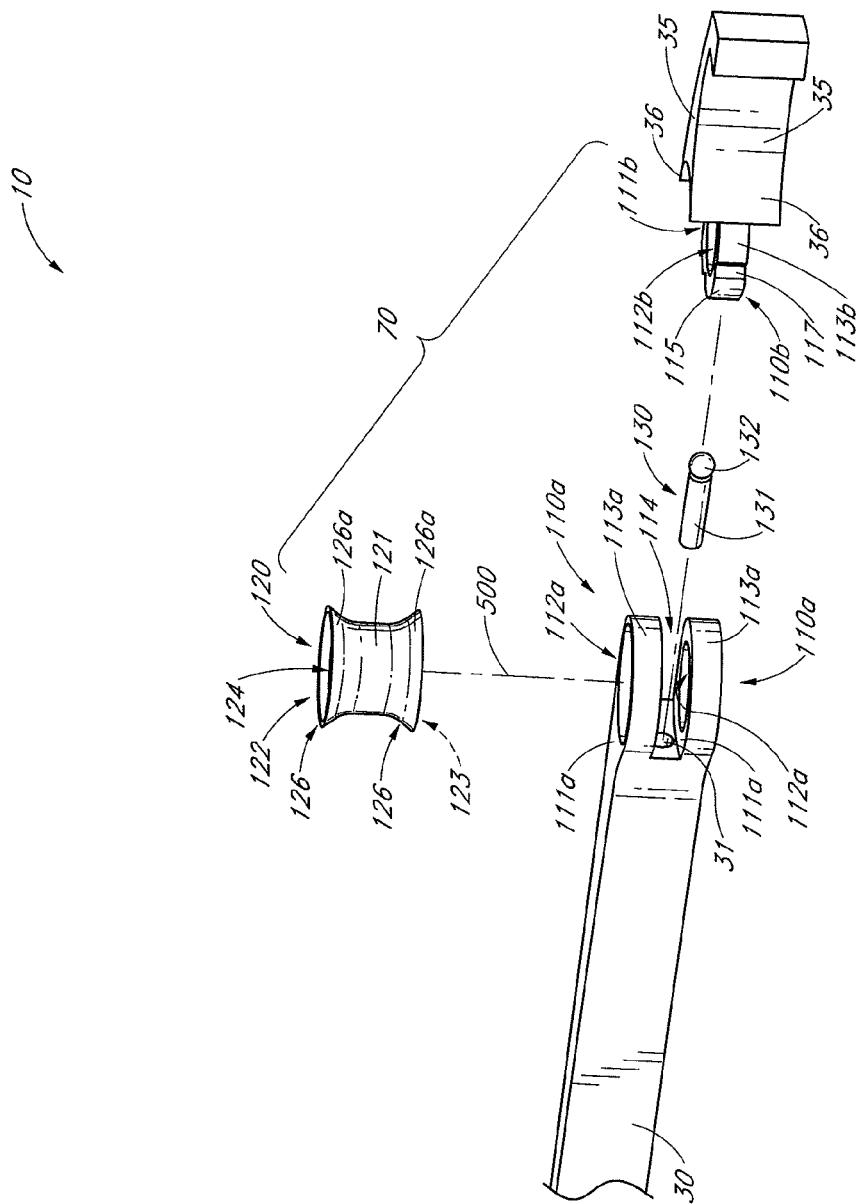
Figure 4:
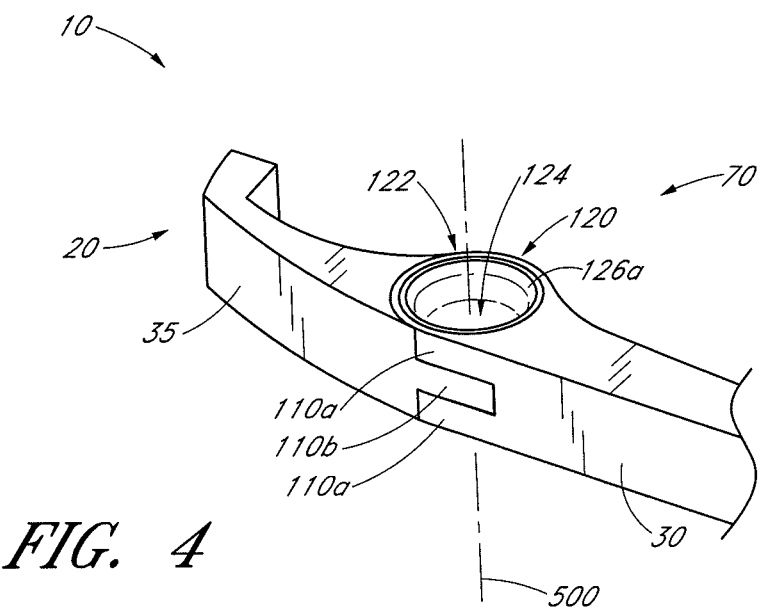
FIGS. 4 and 5 are enlarged, opposing side perspective views of an embodiment of the hinge assembly shown in FIGS. 2 and 3, respectively.
Figure 5:
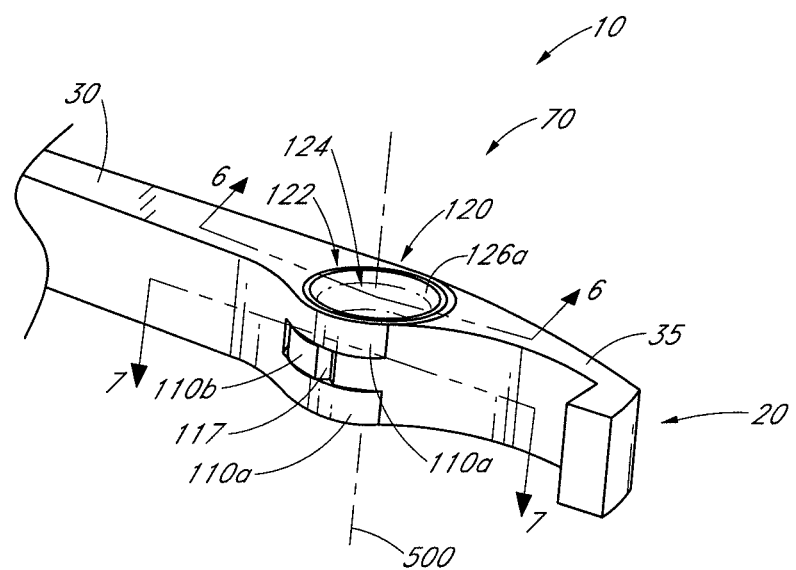
Figure 9A:
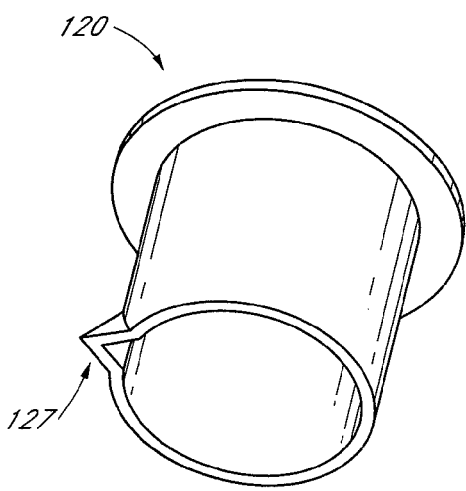
FIG. 9A is a front bottom perspective view of an embodiment of a hub for a hinge assembly for eyewear.
Figure 9B:
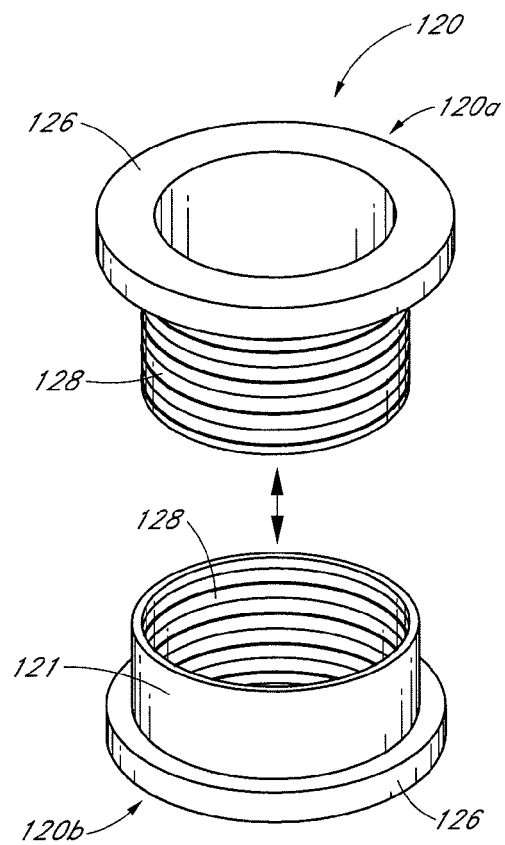
FIG. 9B is a front top perspective view of an embodiment of a hub for a hinge assembly for eyewear.

FIGS. 2 and 3 are enlarged, exploded, opposing side perspective views of an embodiment of a hinge for eyewear, shown here as a screwless hinge assembly 70 for eyeglass frame 10. FIGS. 4 and 5 are enlarged, assembled, opposing side perspective views of an embodiment of the hinge 70 shown in FIGS. 2 and 3, respectively. Referring to FIGS. 2-5, screwless hinge assembly 70 can comprise one or more rotational elements configured to be pivotable with respect to each other about a pivot axis 500, to allow earstem 30 to be moved between a folded and unfolded position. The rotational elements can comprise any of many structures that permit rotational movement, such as a hub, lug, bearing, bushing, hinge, pin, ball and pinion, axle, rotational joint, and the like, or various combinations thereof. In the illustrated embodiment, hinge assembly 170 comprises one or more rotational elements 110*a*, 110*b*. Rotational elements 110*a*, 110*b* can be configured to receive a hub 120, which can retain and support rotational elements 110*a*, and facilitate rotation of rotational elements 110*a*, 110*b* with respect to each other about pivot axis 500. Rotational elements 110*a* and/or 110*b* can be retained by hub 120 in a variety of directions, including lateral and/or axial directions with respect to pivot axis 500, and/or rotationally about pivot axis 500 and/or torsionally with respect to a longitudinal axis extending along earstem 30 and/or temple 35. Hub 120 can comprise one or more retaining elements, for example, one or more flares, flanges, burrs, or other retaining portions that may retain hub 120, rotational element 110*a*, and/or rotational element 110*b* with respect to each other, as described further herein( see FIG. 6B, showing hub 120 with first and second retaining elements 126 in the form of flares; FIG. 9A showing hub 120 with a first retaining element in the form of a flange 126 and a second retaining element in the form of a barb 127; and FIG. 9B showing first and second hub portions 120*a* and 120*b* with first and second retaining elements in the form of flanges 126).

Rotational elements 110*a*, 110*b* can be attached to various portions of frame 10, and can be a separate or integral (unitary) construction with respect to frame 10. In the exemplary embodiment, rotational element 110*a* is attached to earstem 30, and rotational element 110*b* is attached to front portion 20 (e.g., temple 35). Rotational elements 110*a*, 110*b* can be permanently or removably attached to frame 10 in many ways, such as with fasteners, threaded engagement, adhesives, welding, soldering, ultrasonic bonding, friction fit, press fit, snap fit, and the like. Rotational elements 110*a*, 110*b* can be positioned at various points along earstem 30 and front 20. Preferably, rotational element 110*a* is positioned proximate to a proximal end of earstem 30, such that earstem 30 pivots approximately about its proximal end. Preferably, rotational element 110*b* is positioned proximate to a distal end of temple 35, wherein the proximal end of temple 35 is attached to front portion 20.

Rotational elements 110*a*, 110*b* can extend laterally, medially, in a posterior direction and/or in an anterior direction from their point of attachment to earstem 30 and frame 10 (e.g., temple 35), respectively. Preferably, rotational element 110*a* extends in an anterior direction from its point of attachment to earstem 30, and rotational element 110*b* extends in a posterior direction from its point of attachment to temple 35. The rotational elements can be separately formed, or integrally formed with various portions of frame 10, including any of the lens support, lenses 50 (FIG. 1), temples 35, earstems 30, and/or any intermediate support structure.

Continuing to refer to FIGS. 2-5, the rotational elements 110*a*, 110*b* can comprise any of a variety of materials with sufficient rigidity to withstand the lateral, axial, rotational, and/or torsional forces resulting when eyeglass frame 10 is retained on the head of the wearer, and/or when earstems 30 are folded and unfolded. In some embodiments, the rotational elements 110*a*, 110*b* can comprise a material with a coefficient of friction sufficient to allow sliding engagement between opposed, contacting surfaces on elements 110*a*, 110*b*, and/or between contacting surfaces of rotational elements 110*a* and/or 110*b* and hub 120, while still allowing, in some embodiments, resistance to movement between any, some or substantially all of these contacting surfaces. Rotational elements 110*a*, 110*b* can comprise the same or different material with respect to each other. Rotational elements 110*a* and/or 110*b* can comprise plastic or metal. Rubberized or elastomeric materials can be used. Rotational elements 110*a* and/or 110*b* can comprise more than one material, such as a composite, or a metal coated with rubber, plastic, or foam. Rotational elements 110*a* and/or 110*b* can be thermally, chemically or mechanically treated to provide, or can comprise any material that provides, increased durability, flexibility, moisture absorption or adsorption, and/or chemical resistance. Rotational elements 110*a* and/or 110*b* can comprise a material of any color, and can comprise a substantially transparent, opaque, or translucent material, or any combination thereof. The color, transparency, translucency, and/or opacity of the material of rotational elements 110*a* and/or 110*b* can be selected for aesthetic reasons (e.g., to show or hide a portion of an adjacent component through element 110*a* and/or 110*b*), or for the specific optical characteristics of the rotational elements (e.g., its reflectivity, refractivity, etc). In an embodiment, rotational elements 110*a* and/or 110*b* comprise metal.

The rotational elements 110*a*, 110*b* can comprise any of many different shapes, and can comprise the same or different shape with respect to each other. Rotational elements 110*a*, 110*b* can comprise bodies 111*a*, 111*b*, extending from a portion of earstem 30 and temple 35, respectively. Bodies 111*a*, 111*b* can comprise any shape (e.g., outer cross-sectional shape) that can allow rotational elements 110*a*, 110*b* to rotate with respect to each other when engaged with or retained by hub 120. For example, bodies 111*a*, 111*b* can comprise a rectangular, ovular, circular, square, or other regular or irregular cross-sectional shape, with one or more curved or substantially straight portions. In the illustrated embodiment, bodies 111*a*, 111*b* comprise an approximately circular cross-sectional shape.

In some embodiments, temple 35, earstem 30, and/or rotational elements 110*a*, 110*b* (e.g., bodies 111*a* and/or 111*b*, respectively) can comprise one or more extension or arm portions 36 extending therefrom. Such extension or arm portion 36 can be configured to conform to, engage with, provide support and/or wrap partially around a corresponding portion of temple 35, earstem 30, and/or rotational elements 110a, 110b when rotational elements 110a, 110b are engaged with hub 120. Such extensions or arm portions 36 can be used to provide a certain aesthetic appeal and/or provide a smooth, curvilinear transition between temple 35 and earstem 30.

Figure 10A:
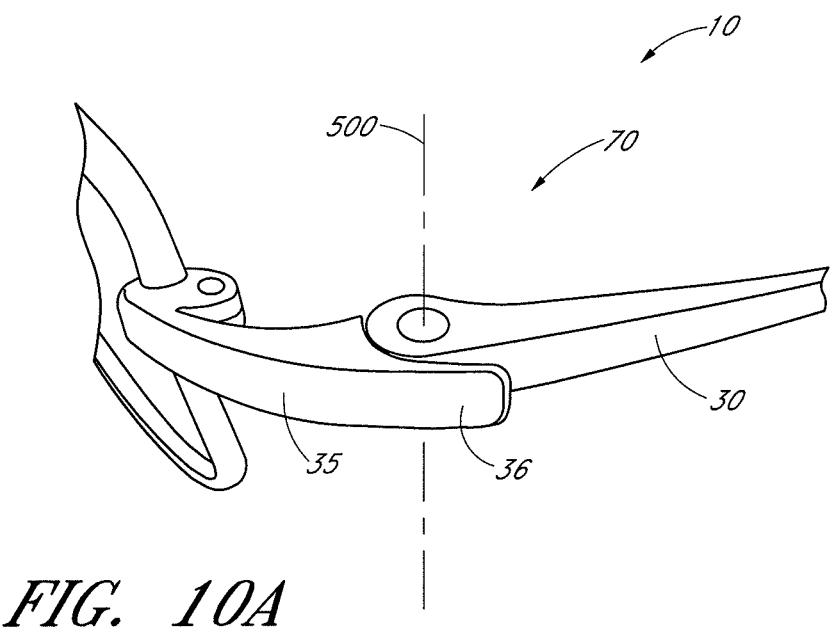
FIGS. 10A and 10B are partial front perspective and top plan views, respectively, of an embodiment of a hinge assembly for eyewear.
Figure 10B:
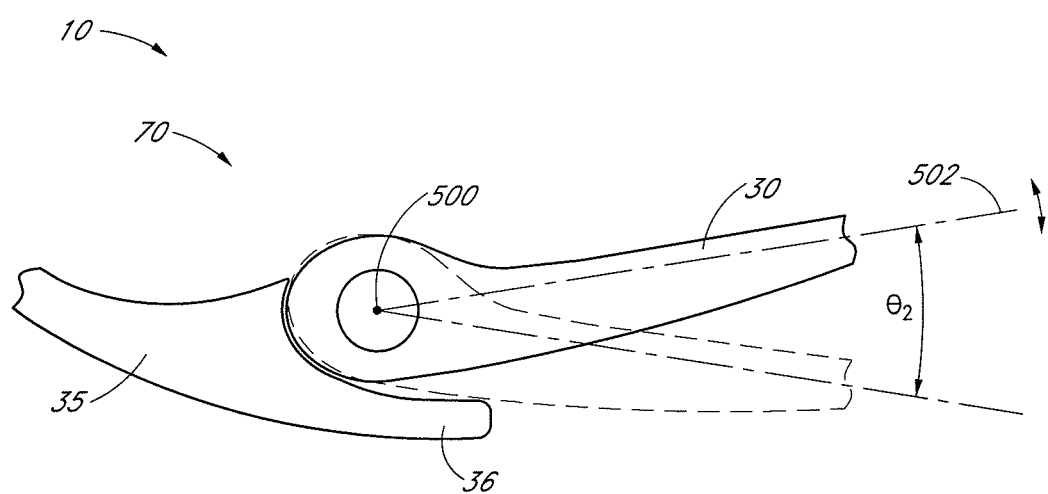

In some embodiments, extensions 36 can be configured to limit the rotation of elements 110a, 110b with respect to each other during the rotation of earstem 30. FIGS. 10A and 10B illustrate an embodiment of a hinge assembly for eyewear comprising an extension or arm 36 configured to act as a stop to limit rotation (e.g., outward, or lateral rotation) of earstem 30 with respect to temple 35. In some embodiments, aim 36 can limit outward rotation of earstem 30 beyond its unfolded or open position (as indicated by axis 502; FIG. 10B), to an angle $\theta_2$. The amount of rotation of earstem 30 that can be limited by arm 36 can be varied. For example, in some embodiments, angle $\theta_2$ can fall within a range of between about at least 3 degrees and/or less than or equal to about 60 degrees. In some embodiments, angle $\theta_2$ can fall within a range of between about at least 10 degrees and/or less than or equal to about 45 degrees. Further, in some embodiments, angle $\theta_2$ can be about 20 degrees.

Referring again to FIGS. 2-5, the rotational elements 110a, 110b can include channels 112a, 112b extending partially, mostly, or preferably, completely through the bodies 111a, 111b, to form sidewalls 113a, 113b in bodies 111a, 111b, respectively. Sidewalls 113a and/or 113b can be configured to extend partially, mostly, or completely around channels 112a and/or 112b, respectively. For example, sidewalls 113a and/or 113b can extend completely around channels 112a and/or 112b to form a loop that receives hub 120. In other embodiments, a rotational element can be configured with a sidewall that extends mostly, but not completely around a channel (e.g., to form an axial cross-section that is approximately "C" shaped).

Channels 112a, 112b can comprise the same or different cross-sectional shape with respect to each other, and/or with respect to bodies 111a, 111b. Channels 112a, 112b can comprise an approximately constant cross-sectional shape and/or size along some, most or substantially all of their length, and/or can vary (e.g., gradually or abruptly) in size and/or shape along some, most or substantially all of their length. For example, the inner surface of sidewalls 113a, 113b can be configured such that channel 112a and/or 112b are a substantially cylindrical shape. The inner surface of sidewalls 113a, 113b can be configured such that channel 112a and/or 112b are a substantially frustroconical shape. In some embodiments, channels 112a, 112b can be configured such that the inner surface (e.g., perimeter) of sidewalls 113a and/or 113b can engage with a hub 120 with a friction or clearance fit. Channels 112a, 112b can be positioned to extend at various angles with respect to bodies 111a, 111b, temple 35, and/or earstem 30. In some embodiments, channels 112a, 112b are positioned to extend approximately coaxially with axis 500 through bodies 111a, 111b. It will be understood that the aforementioned variations in shape and/or size of channels 112a, 112b and sidewalls 113a, 113b can be implemented along a portion of or along substantially the entirety of the length of channels 112a, 112b and sidewalls 113a, 113b, as measured along axis 500.

The number of rotational elements implemented with hinge 70 can be varied. For example, in some embodiments, a single rotational element attached to an earstem can be implemented with a corresponding single rotational element attached to a portion of an eyeglass frame, with a hub providing axial and/or lateral retention of the two rotational elements with respect to each other. In some embodiments, two or more rotational elements can be attached to one or both of the earstem and the eyeglass frame. As illustrated in FIGS. 2-5, hinge 70 can comprise a pair of rotational elements 110a, positioned with a gap 114 extending therebetween. Rotational elements 110a, 110b and gap 114 can be configured to allow rotational element 110b to be inserted between the pair of rotational elements 110a and received by gap 114, with an interference or clearance fit therebetween (as shown in the region 107 of FIG. 2). An interference fit can be provided with sufficient frictional force to support rotational element 110b between the pair of rotational elements 110a, and/or to provide rotational resistance between elements 110a and 110b, while still allowing earstems 30 to fold and unfold. A clearance fit can be provided between rotational element 110b and the pair of rotational elements 110a to allow elements 110a and 110b to easily (e.g., freely) rotate with respect to each other. With such a clearance fit, rotational resistance between elements 110a and 110b can be provided through other structure, e.g., through the use of a resistance element, or through an interference fit between hub 120 and rotational element 110a and/or 110b, as described further herein. It will be understood that the pair of rotational elements 110a configured to engage with a single rotational element 110b is shown for illustrative purposes only, and a pair of rotational elements 110b can be configured to engage with a single rotational element 110a. In some embodiments, a variety of quantities (e.g., one, a pair, or more than a pair) of rotational element 110a and/or 110b can be implemented, and function substantially similar to those described above and illustrated in the Figures. For example, temple 35 can comprise a pair of rotational elements 110b that engage with a single rotational element 110a on earstem 30.

Figure 6A:
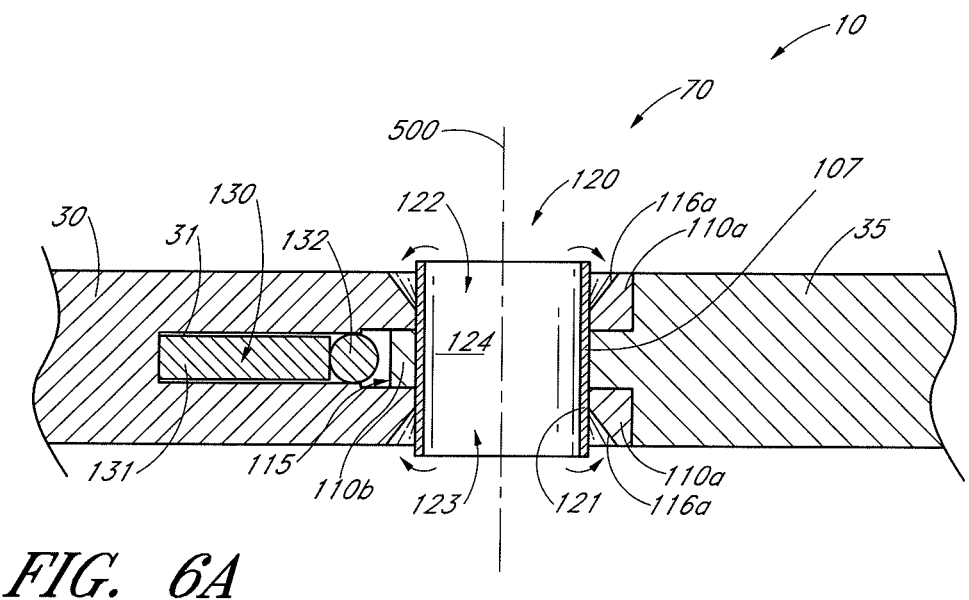
FIG. 6A is a partial cross-sectional view of an embodiment of a hinge assembly for eyewear taken along line 6-6 of FIG. 5, including rotational elements and a hub that can be inserted into the rotational elements.
Figure 6B:
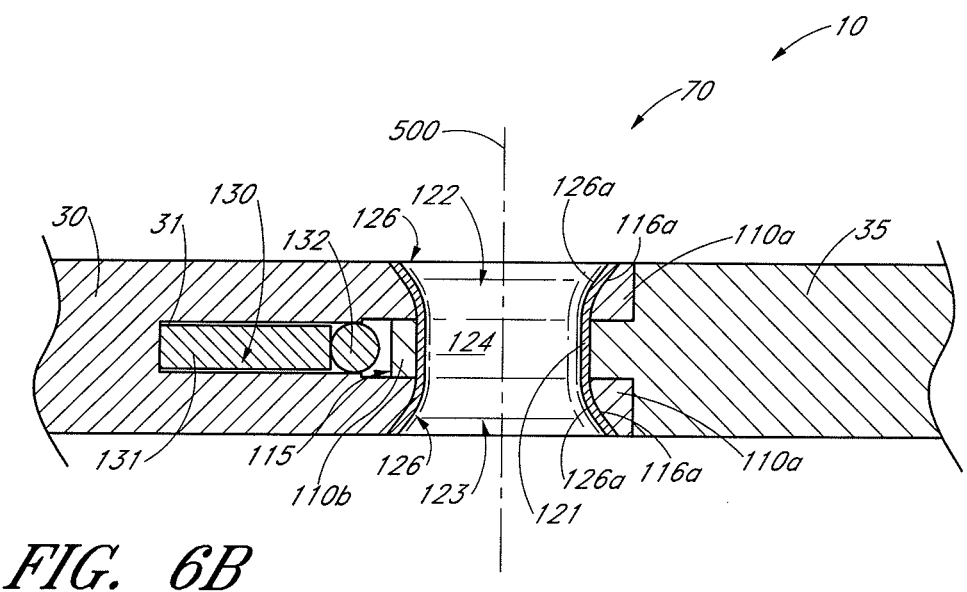
FIG. 6B is a partial cross-sectional view of an embodiment of the hinge assembly shown in FIG. 6A, wherein the shape of the hub is altered to retain the rotational elements with the hub and with respect to each other.

FIGS. 6A and 6B are partial cross-sectional views taken along line 6-6 of FIG. 5. FIGS. 6A and 6B illustrate an embodiment of hub 120 that can be easily inserted into rotational elements 110a, 110b (FIG. 6A), and subsequently altered, to form additional retaining structure between hub 120 and rotational elements 110a, 110b (FIG. 6B), as described elsewhere herein. Referring to FIGS. 2-6B, hub 120 can be configured to be received by, engage with, support and/or retain rotational elements 110a, 110b in the variety of directions described herein, to facilitate rotation of rotational elements 110a, 110b with respect to each other. Hub 120 can engage with and/or retain rotational elements 110a and/or 110b through direct contact, or attachment to an intermediary structure (such as a bushing, sleeve, etc.) positioned between hub 120 and rotational members 110a and/or 110b. In some embodiments, hub 120 can be configured to engage with elements 110a, 110b to resist rotational motion of rotational elements 110a, 110b with respect to each other. In some embodiments, the surface of hub 120 that engages with rotational elements 110a, 110b is without threads (e.g., helical threads).

Hub 120 can comprise any of a variety of materials with sufficient rigidity to withstand the lateral, axial, rotational, and/or torsional forces described herein when eyeglass frame 10 is retained on the head of the wearer, and when earstems 30 are folded and unfolded. In some embodiments, the hub 120 can comprise a material with a coefficient of friction sufficient to allow sliding engagement between contacting surfaces of hub 120 and elements 110a and/or 110b, while still allowing, in some embodiments, resistance to movement between any, some or substantially all of these contacting surfaces. Hub 120 can comprise any of the materials described herein for rotational elements 110a, 110b and can comprise the same or different materials as rotational elements 110a and/or 110b.

In a preferred embodiment, hub 120 comprises a corrosion-resistant material and/or is coated with a corrosion resistant material, such as stainless steel, brass, nylon, nickel and/or silver alloys. In some embodiments, hub 120 can comprise a material that allows a portion of hub 120 to be formed into a retention element (e.g., after hub 120 is inserted into channels 112*a*, 112*b*; FIGS. 6A and 6B).

Hub 120 (e.g., its outer perimeter and/or outer surface) can comprise any of a variety of shapes that can be received by rotational elements 110*a* and/or 110*b* while facilitating the relative rotation and retention of elements 110*a*, 110*b*. Hub 120 can comprise any of a variety of square, rectangular, circular, ovular, or other cross-sectional shapes that form a stud, shaft, hub, tube or similar structure when extended axially (e.g., along pivot axis 500). Hub 120 can comprise an approximately constant cross-sectional shape and/or size along some, most or substantially all of its length, or can vary (e.g., gradually, or abruptly) in size and/or shape along some, most or substantially all of its length. Hub 120 can be substantially the same shape as channels 112*a*, 112*b*. In some embodiments, hub 120 can be a substantially different shape than channels 112*a*, 112*b*, provided that sufficient contact can be maintained between hub 120 and elements 110*a* and/or 110*b* (e.g., the sidewalls 113*a*, 113*b*), or an intermediary structure, to facilitate the relative rotation and retention of elements 110*a* and/or 110*b* described herein. Hub 120 can be a substantially hollow or solid shape. Hub 120 can comprise a substantially tubular shape (e.g., a cylindrical tube), with one or more open or closed ends. Hub 120 and/or elements 110*a* and/or 110*b* can include various features to control the amount of engagement (e.g., frictional engagement) between hub 120 and/or elements 110*a* and/or 110*b* (or an intermediary structure). For example, these components can include various dimples, nipples, surface textures and contours (e.g., concave protrusions and convex recessions), ribs, slots, grooves, perforations, protrusions and the like, spanning across and/or extending partially or completely through various portions of its surface or body.

In the exemplary embodiment of FIGS. 2-6B, hub 120 comprises a substantially tubular shape with an optional inner hub channel 124 formed by one or more sidewalls 121 extending between openings 122 and 123 positioned at the opposed ends of hub 120. Preferably, hub 120 comprises an approximately cylindrical tube. Hub channel 124 can be configured to provide a certain aesthetic appeal and can provide utility, by allowing retention or passage of a strap, wiring (e.g., for audio headphones), inserts (e.g., colored, clear, transparent, translucent inserts), lights and the like through hinge assembly 70. The inner perimeter (e.g., diameter) of channel 124 can comprise approximately the same or different cross-sectional shapes with respect to the outer perimeter of hub 120 (e.g., the outer perimeter of sidewall 121).

Sidewall 121 can be configured to extend partially, mostly, or completely around channel 124. In some embodiments, sidewall 121 can comprise an unbroken perimeter around channel 124. In some embodiments, sidewall 121 can extend partially around channel 124, leaving a gap 125 in the perimeter formed by sidewall 121 (FIG. 8B).

Hub 120 can engage with rotational element 110*a* and/or 110*b* in any of a variety of ways. Various portions of hub 120 (e.g., its outer perimeter or circumference, and/or the retaining elements described further herein) can be configured to form an interference or clearance fit with rotational elements 110*a* and/or 110*b* (e.g., the inner perimeter or circumference of sidewalls 111*a*, 111*b*, respectively). For example, a portion of hub 120 can be configured to form an interference fit with both rotational elements 110*a* and 110*b*, to provide transverse, lateral, and axial retention of elements 110*a* and 110*b* with respect to hub 120, while allowing both elements 110*a* and 110*b* to rotate with respect to hub 120 with a desired rotational resistance.

In some embodiments, a portion of hub 120 (such as the first and second retaining portions 126 as shown in FIG. 6B) can be configured to foam an interference fit with one of either rotational element 110*a* or 110*b* (such as rotational element 110*a* as shown in FIG. 6B), with sufficient strength to prevent substantial movement of that rotational element with respect to hub 120. In this embodiment, hub 120 can be fixed with respect to rotational element 110*a* or 110*b*. Such an embodiment can include a clearance fit or an interference fit with sufficient strength between hub 120 and the other rotational element, to allow elements 110*a*, 110*b* to move (e.g., rotate) with respect to each other, with or without substantial resistance.

In some embodiments, hub 120 can be configured to form a clearance fit between portions of hub 120 and both elements 110*a* and 110*b*. For example, the outer perimeter of hub 120 may be configured with a clearance fit with respect to the inner perimeter of sidewalls 111*a* and 111*b*, to facilitate insertion of hub 120 into elements 110*a* and 110*b*, and to reduce frictional wear on the outer perimeter of hub 120. Such an embodiment may include an interference fit between rotational elements 110*a* and 110*b* (e.g., within gap 114), to provide axial and/or lateral retention and stability, and/or rotational resistance between elements 110*a*, 110*b* and/or hub 120. Additionally or alternatively, hub 120 can comprise one or more retention elements to provide axial and/or lateral retention and stability, and/or rotational resistance between elements 110*a*, 110*b* and/or hub 120.

In some preferable embodiments, the portion of hub 120 (e.g., the outer surface, or outer diameter of sidewall 121) and the one or more corresponding portions of rotational elements 110*a*, 110*b* with which the hub portions engage (e.g., the inner perimeter of sidewalls 111*a* and/or 111*b*) can be configured without threads. Avoiding these threads can reduce the stresses in the eyewear frame that are caused by conventional eyewear hinges using screws. Avoiding these threads can allow a larger hub (e.g., with a larger outer diameter) to be implemented, providing a stronger hinge connection. For example, in some embodiments, the outer diameter of hub 120 (e.g., sidewall 121) can fall within a range of between about at least 1 mm and/or less than or equal to about 8 mm. In some embodiments, the outer diameter of hub 120 can fall within a range of between about at least 2 mm and/or less than or equal to about 6 mm. Further, in some embodiments, the outer diameter of hub 120 can be about 3 mm.

In some embodiments, hub 120 can include one or more retention elements to retain rotational elements 110*a* and/or 110*b* with respect to hub 120, while allowing relative rotation between elements 110*a* and 110*b*. The retention elements can be configured to allow, resist, or restrict rotation of elements 110*a* and/or 110*b* with respect to hub 120, for example, by using any combination of the interference and clearance fits described to allow, resist, and/or restrict motion between rotation elements 110*a* and 110*b*. For example, hub 120 can include two retention elements at its opposed ends, wherein the axial distance between the retention elements is less than the distance between the portions of hub 120 with which the retention elements are engaged. Such embodiments can provide an axial force that axially retains elements 110*a* and 110*b* with respect to each other and hub 120 when hub 120 is received by elements 110*a*, 110*b*.

The retention elements can comprise any of a variety of configurations, such as one or more flanges (FIGS. 2-5;

6B-9B), tabs, pins, hooks, barbs (e.g., barb 127; FIG. 9A), burrs, grooves, and the like, or combinations thereof, configured to retain either or both ends of hub 120. In some embodiments, a retention element can comprise a surface of hub 120 configured to frictionally engage with a corresponding surface of rotational elements 110*a* and/or 110*b*. The retention elements can be positioned on various portions of hub 120 and elements 110*a* and/or 110*b*, such as various positions along their axial length, perimeter (circumference), outer (e.g., upper and/or lower) edges, and the like. The retention elements can comprise a substantially continuous structure (such as a flange) or a structure spaced along hub 120 and/or elements 110*a* and/or 110*b* (such as a plurality of tabs spaced around an upper edge of hub 120). The retention elements can be removably or permanently attached to hub 120 and/or elements 110*a* and/or 110*b*, and/or can be integrally or separately formed therewith.

Referring to FIGS. 2-5 and 6B-9B, hub 120 can comprise one or more retention elements, or flanges 126, configured to engage with a corresponding surface (e.g., an outer, upper and/or lower surface) of rotational elements 110*a* and/or 110*b*. Flange 126 can be any of a variety of shapes, and generally comprises an approximately annular ring extending radially outwardly from hub 120 (e.g., from the ends of hub 120). The transition between flange 126 and the remaining portion of hub 120 (e.g., sidewall 121) can be an abrupt or "stepped" transition (FIGS. 8A, 9A and 9B). Referring to FIGS. 2-5, 6B and 8B, flange 126 can comprise a tapered, radiused or curvilinear portion 126*a* extending radially around the perimeter of an end of hub 120, to provide a smooth, gradual transition between the sidewall 121 of hub 120 and the outer perimeter of flange 126. The tapered, radiused or curvilinear portion 126*a* can provide additional surface area on flange 126 for additional engagement with rotational elements 110*a* and/or 110*b*.

Referring to FIGS. 6A and 6B, rotational element 110*a* and/or 110*b* can comprise a corresponding tapered, radiused or curvilinear portion 116*a* configured to conform to and engage with portion 126*a*. In some embodiments, portion 116*a* can comprise a countersink or a counterbore in the outer surface of rotational elements 110*a* and/or 110*b* to receive and engage with hub 120 (e.g., flange 126). Referring to FIGS. 4, 5 and 6B, in some embodiments, portion 116*a* and hub 120 (e.g., flange 126) can be configured such that the outer (e.g., superior and/or inferior) surface of hub 120 can be seated adjacent to or against the outer (e.g., superior and/or inferior) surface of rotational elements 110*a* and/or 110*b*, earstem 30, and/or temple 35. For example, in some embodiments, the outer surface of the hub 120 can be proud, flush, or recessed with respect to the outer (e.g., superior and/or inferior) surface of rotational elements 110*a* and/or 110*b*, earstem 30, and/or temple 35. Such a proud, flush, or recessed configuration can provide a certain aesthetic appeal. Further, if the outer surface of the hub 120 is configured to be flush or recessed with respect to the outer surface of the rotational elements or earstem, it may also avoid entanglement or interference with external objects (e.g., hair) during use of eyeglasses 10.

Figure 8A:
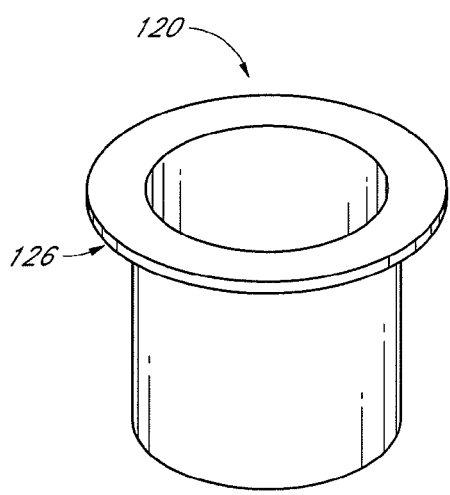
FIGS. 8A and 8B are front top perspective views of embodiments of a hub for a hinge assembly for eyewear.
Figure 8B:
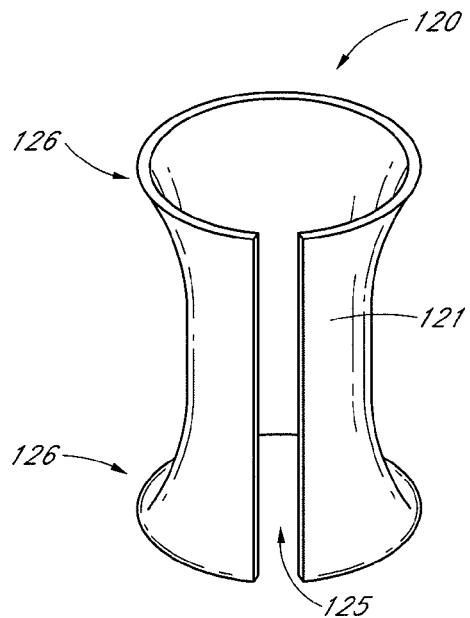

FIG. 8A illustrates an embodiment of hub 120 that can be implemented with various embodiments of the screwless hinge assemblies described herein. Hub 120 can include a flange 126 configured at a first (e.g., upper or superior) end, functioning substantially similar to the other embodiments of flange 126 described herein. The opposing (e.g., lower or inferior) end of hub 120 can be configured without a flange, and can be held in place by gravity when hub 120 is received by rotational elements 110*a* and 110*b* (e.g., without substantial engagement, e.g., a clearance fit between hub 120 and rotational elements 110*a* and/or 110*b*). In some embodiments, a second, opposing end of hub 120 (e.g., the outer perimeter of its sidewall) can be configured to engage with rotational elements 110*a* and/or 110*b* with a friction or interference fit to provide a retention element function without requiring additional structure such as flanges, burrs, etc. In some such embodiments, the friction or interference fit can have sufficient strength to fix or restrict motion of the second end of hub 120 with respect to rotational elements 110*a* or 110*b*. In other such embodiments, the interference fit can have sufficient strength to allow sliding engagement, with rotational resistance, of the second end of hub 120 with respect to rotational elements 110*a* and/or 110*b*.

FIG. 8B illustrates an embodiment of hub 120 that can be implemented with various embodiments of the screwless hinge assemblies described herein. In this embodiment, sidewall 121 can extend partially around channel 124, leaving a gap 125 in the perimeter formed by sidewall 121 (e.g., to form a cross-sectional "C" shape). Such an embodiment can allow radial and circumferential flexation of the ends of sidewall 121 to facilitate insertion of hub 120 into elements 110*a*, 110*b*.

FIG. 9A illustrates an embodiment of hub 120 that can be implemented with various embodiments of the screwless hinge assemblies described herein. In the illustrated embodiment, hub 120 includes a flange 126 configured at its first (e.g., upper or superior) end, functioning substantially similar to the other embodiments of flange 126 described herein. Hub 120 includes a barb 127 extending radially from a portion of hub 120, such that the barb 127 can engage with and retain elements 110*a*, 110*b*. Barb 127 can be positioned along various portions of the length and/or outer perimeter of hub 120. In the illustrative embodiment barb 127 extends from the end of hub 120 opposing flange 126. It will be understood that hub 120 can be implemented with one or more barbs, at either or both ends of hub 120. With embodiments of hub 120 comprising one or more barbs 127, one or more of the barbs can be formed on hub 120 before or after hub 120 is inserted into rotational elements 110*a*, 110*b*, similar to the methods described elsewhere herein with reference to the formation of one or more flanges 126 on hub 120 (FIGS. 6A and 6B).

The screwless hinge assemblies described herein can include one or more resistance elements configured to resist motion between the rotational elements and/or the hub and provide resilient feedback to the user as the earstems are moved between a folded and unfolded position. Such resistance elements can provide the resistance to earstem movement conventionally provided through a tightened screw in a conventional eyeglass hinge, but which may decrease as the screw loosens over time. In some embodiments, the resistance element can provide resilient feedback to the user to indicate when the earstems have reached a fully open and/or closed position. The resistance elements can comprise e.g., springs, dampers, shocks, levers, cams, and a variety of other linear and rotational mechanisms than can apply a linear or rotational force. In some embodiments, the rotational elements can apply a linear force against hub 120, rotational element 110*a*, and/or rotational element 110*b*, which converts to rotational resistance between these components when rotated with respect to each other (e.g., around axis 500).

Referring to FIGS. 2-3 and 6A-7, hinge assembly 70 can comprise a resistance element, illustrated as a biasing mechanism 130. Biasing mechanism 130 can be configured to be supported by at least one of the earstem 30 and front portion 20 (e.g., temple 35), and to apply a linear force against the rotational element 110*a* or 110*b* on the other of the earstem 30 and front portion 20. For example, biasing mechanism 130 can be supported by the temple 35, and can be configured to apply a force against rotational element 110a. Preferably, biasing mechanism 130 can be supported by earstem 30, and can be configured to apply a force against rotational element 110b. Supporting biasing mechanism 130 with earstem 30 can provide a leaner, more appealing aesthetic, and allows the size of temple 35 to be reduced, thus reducing the overall footprint of frames 10 in the folded position.

Biasing mechanism 130 can be supported by temple 35 and/or earstem 30 in any of a variety of ways. Biasing mechanism 130 can be permanently or removably attached to various portions of an external side (e.g., a superior, inferior, lateral or medial side) of temple 35 and/or earstem 30. In the illustrated embodiment, biasing mechanism 130 is supported by earstem 30 within a channel 31 that extends longitudinally within earstem 30. Preferably, channel 31 extends distally from the proximal end of earstem 30. Even more preferably, channel 31 extends from between the attachment points of a pair of rotational elements 110a to earstem 30 (e.g., from gap 114), such that channel 31 and biasing mechanism 130 are completely hidden from the exterior view of eyeglass 10. Such an embodiment provides a certain aesthetic appeal, and encloses biasing mechanism 130 within eyeglass 10, reducing the likelihood of mechanism 130 from being lost during use of the eyeglass 10.

Biasing mechanism 130 can comprise a spring, shock, coil or other resilient element 131 capable of providing a linear force against rotational element 110a or 110b. In a preferred embodiment, resilient element 131 can comprise an elongated resilient member comprising a resilient material such as plastic or rubber. In its quiescent state, resilient element 131 is preferably longer than channel 31, so that it can be preloaded with a linear force when inserted into channel 31 when hinge assembly 70 is assembled. Resilient element 131 can be sized and shaped with respect to channel 31 (e.g., with sufficient clearance therebetween) to allow resilient element 131 to move and flex longitudinally, axially, and radially within and along the length and/or width of channel 31. Biasing mechanism 130 can comprise any of a variety of materials with sufficient rigidity and flexibility to provide a linear spring force, such as plastic, rubber or metal. Preferably, biasing mechanism 131 comprises spring steel.

In some embodiments, biasing mechanism 130 can comprise a guide element, such as a pin, guide, track, slot, groove or ball bearing 132, to facilitate movement of (e.g., guide) biasing mechanism 130 along a surface of rotational element 110b. Ball bearing 132 can be configured to facilitate a smooth rotation of rotational element 110b while biasing mechanism 130 is applying a linear force thereto. In the illustrated embodiment, ball bearing 132 is positioned at the distal end of resilient element 131, to provide a rolling contact, or at least a reduced contact area, if guide element 132 is constrained from rolling, along a surface of rotational element 110b.

Rotational elements 110a and/or 110b can comprise a pin, guide, track, slot, groove, ball bearing, cam or other guide element to provide a path for (e.g., guide) the corresponding guide element 132 of biasing mechanism 130 along a portion (e.g., an outer-facing surface of sidewall 113b) of elements 110a and/or 110b during rotation of elements 110a and/or 110b with respect to each other. In the illustrated embodiment, a guide element, or cam 115 is configured to extend at least partially along the outer-facing surface of sidewall 113b, to provide a cam path for ball bearing 132 on element 110b.

Referring to FIG. 7A, earstem 30 can be configured to rotate with respect to temple 35 around axis 500 between an unfolded, open, or as-worn position (shown in solid lines) and a folded or closed position (shown in hidden lines). The directional arrows 501 illustrate the arcuate path of movement of the earstem 30.

In some embodiments, it may be desired to provide a detent stopping mechanism that stops or provides a substantially increased-resistance to angular rotation of earstem 30 at a discrete point with respect to temple 35, for example, when earstem 30 is moved to its outermost unfolded or innermost folded state, or any discrete point therebetween. Such a stopping mechanism can provide resilient feedback to the user when earstem 30 is at its unfolded or folded state, reducing the likelihood of overrotation and damage of earstem 30 with respect to the remainder of eyeglass 10.

A stopping mechanism can be configured to engage with various features of rotational element 110a and/or 110b with corresponding features on earstem 30, temple 35 (e.g., aim 36; FIGS. 2, 3, 10A and 10B) and/or biasing mechanism 130. In some embodiments, one or more notches 117 can be configured along a portion of rotational element 110b (e.g., an outer-facing surface of sidewall 113b) to engage with, and thus provide a stop for, a portion of biasing mechanism 130 (e.g., ball 132). In the illustrated embodiment, two notches 117 are provided to limit the approximate angular span of rotation of earstem 30 between the folded and unfolded position to an angle $\theta_1$. Angle $\theta_1$ can vary, depending on the configuration of the earstems, front portion, lens support, temples, lenses, and other components of the eyewear.

For example, in some embodiments, angle $\theta_1$ can fall within a range of between about at least 45 degrees and/or less than or equal to about 120 degrees. In some embodiments, angle $\theta_1$ can fall within a range of between about at least 80 degrees and/or less than or equal to about 105 degrees. Further, in some embodiments, angle $\theta_1$ can be about 95 degrees. Stops 117 are optional, as is cam 115, and can be used individually, or in combination with each other. In a preferred embodiment, cam 115 is configured to guide the biasing mechanism 130 to either or both stops 117 along a cam path extending along a portion of the surface of rotational element 110b.

Referring now to FIG. 7B, another embodiment of an eyeglass 10' is shown which comprises a uniquely configured earstem 30' and a front portion 20' of the temple 35'. The various features of the eyeglass 10' and its components can be combined with those features of other embodiments and components discussed herein, the discussion of which will not be repeated here for brevity Similar to the embodiment illustrated in FIG. 7A, the earstem 30' can be configured to rotate with respect to the temple 35' around axis 500 between an unfolded, open, or as-worn position (shown in solid lines) and a folded or closed position (shown in hidden lines) along an arcuate path 501. The embodiment of FIG. 7B illustrates an embodiment of a stopping mechanism that is configured to provide an increasing amount of resistance as the earstem 30' hyperextends or continues to rotate about the axis 500 toward a position beyond a fully open position.

In the illustrated embodiment, the resilient element 131' can act against a biasing surface 117' to provide resistance to rotation of the earstem 30'. As illustrated, the biasing surface 117' can provide a generally arcuate path or surface with which the resilient element 131' can be placed into contact. As the ear stem 30' rotates from the fully open position (shown in FIG. 7B) toward a hyperextended position (not shown), the ball or head of the resilient element 131' will continue to be urged into the channel 31', which causes the resilient element 131' to undergo greater compressive stress, which in turn provides greater resistance against the biasing surface 117' and greater resistance to rotation hyperextending from the fully open position. Accordingly, in such an embodiment, the resilient element 131' can provide a double acting mechanism that tends to resist hyperextension and also tends to urge the earstem 30' toward the fully open position from a hyperextended position.

The angular orientation of the biasing surface 117' can be modified to provide a desired degree of resistance. The biasing surface 117' can be generally flat, concave, and/or convex. Accordingly, the biasing surface 117' can be configured such that the stopping mechanism provides an increasing, decreasing, or steady resistance to rotational hyperextension.

In addition, the front portion 20' can comprise a rotational element 110b' that projects or extends above a gap formed between the earstem 30' and the temple 35. The element 110b' can extend only minimally across the gap or provide substantial extension over the gap, similar to the arm portion 36 shown in the embodiment of FIG. 10B. Further, in some embodiments, the anterior end of the earstem 30' can be configured to contact the element 110b' in order to provide a maximum hyperextended position. The configuration and spacing of the anterior end of the earstem 30' and the element 110b' can be adjusted to provide a larger smaller gap between these components, and providing for a greater or lesser range of hyperextended movement of the earstem 30'.

Resilient element 131 can comprise a spring constant of varying amounts, to provide varying levels of rotational resistance between elements 110a and 110b, and/or to provide varying resistance when biasing mechanism 130 engages with one or more stops 117. A spring constant may also be selected based upon the rotational resistance provided by the other components of screwless hinge 70. For example, in the aforementioned embodiments wherein a clearance fit is provided between rotational elements 110a and/or 110b and/or hub 120, a greater spring constant may be desired to provide additional rotational resistance while folding/unfolding earstem 30. In the aforementioned embodiment wherein an interference fit is provided between elements 110a and/or 110b and/or hub 120, a greater spring constant may be desired to provide increased rotational resistance, or a lower spring constant may be sufficient to provide the overall desired rotational resistance. In some embodiments, the spring constant of resilient element 131 can fall within a range of between about at least 0.1 N/m and/or less than or equal to about 120 N/m. In some embodiments, the spring constant of resilient element 131 can fall within a range of between about at least 0.3 N/m and/or less than or equal to about 40 N/m. Further, in some embodiments, the spring constant of resilient element 131 can be about 0.7 N/m.

It will be understood that "screwless hinge assembly" as used herein does not necessarily suggest eyeglass frame 10 or various components of screwless hinge assembly 70 do not comprise any threaded portions. For example, referring to FIG. 9B, hub 120 can comprise a first portion 120a with threads 128 configured to engage with corresponding threads 128 on a second portion 120b. This embodiment can facilitate the insertion of hub portions 120a, 120b into channels 112a and/or 112b (FIGS. 2-6B) from opposing directions, and engagement of the threads to connect hub portions 120a, 120b, and to form hub 120, without requiring the additional flanging step shown in FIGS. 6A-6B. This embodiment can include threads that extend some or, preferably, the entire axial length of the first and/or second portions 120a, 120b. The increased axial length of the threaded portion better inhibits loosening of portions 120a, 120b in comparison to conventional eyeglass screws. Additionally, in embodiments of hub 120 with channel 124, (FIGS. 2-6B) the threaded portions 120a, 120b can have a larger thread diameter than a conventional eyeglass screw, allowing for improved easier and more consistent manufacturing. In some embodiments, hub 120 can comprise two or more portions similar to portions 120a, 120b, and configured to connect with mechanisms other than threaded portions, such as a snap fit, taps, grooves, slots, and the like.

A screwless hinge for eyewear can be manufactured using embodiments of the apparatus described herein and shown in the figures, using various methods. For example, hub 120 can be received by (e.g., inserted into) rotational elements 110a, 110b using a variety of manufacturing and assembly methods. For example, referring to FIGS. 2 and 3, rotational elements 110a, 110b can be positioned proximate to each other, and aligned e.g., by substantially aligning channels 112a and 112b along axis 500. Hub 120 can be moved axially along axis 500, and positioned proximate to rotational elements 110a and 110b, and inserted or pressed into channels 112a, 112b, such that hub 120 engages with and retains rotational elements 110a, 110b. In some embodiments, hub 120 can be moved proximate to, aligned with, and inserted into one of rotational elements 110a, 110b in a first step, and the hub/rotational element assembly can be moved proximate to and aligned with one or more of the remainder of rotational elements 110a, 110b, followed by insertion of the hub 120 into one or more of the remainder of rotational elements 110a, 110b.

In some embodiments, all or portions of hub 120, such as, e.g., flanges 126, can comprise pleats, ribs, folds, slots, grooves, gaps, or other structure (see, e.g., FIG. 8B described further herein) that allow hub 120 to be radially and/or circumferentially compressed, to facilitate the insertion of hub 120 into rotational elements 110a, 110b. In such embodiments, after insertion, the compressed portions of hub 120 can expand, retaining hub 120 and rotational elements 110a, 110b with respect to each other.

Referring to FIG. 6A, in some embodiments, hub 120 can comprise an initial configuration (e.g., a substantially tubular shape) that can be easily inserted into rotational elements 110a, 110b. Referring to FIG. 6B, after insertion, the shape of hub 120 can be altered in a subsequent step to form additional structure that retains rotational elements 110a and/or 110b with hub 120 and with respect to each other. For example, a force (e.g., an axial and/or a radial force) can be applied to hub 120 to expand one or both ends of hub 120 after initial insertion into channels 112a, 112b, and form one or more flanges 126 to engage surfaces 126a with surfaces 116a. It will be understood that the structure of the screwless hinge assembly 70 shown in FIG. 6B can be obtained through other methods (e.g., in a single initial manufacturing or assembly step, such as a press fit, etc.) without implementation of the first step shown in FIG. 6A and the subsequent transformation described herein and shown in FIG. 6B. Additionally or alternatively, one or both ends of hub 120 can be preformed with flanges 126 without the expansion step described herein during the engagement of hub 120 with elements 110a and/or 110b.

In an embodiment, a screwless hinge for eyewear can be manufactured using the following steps: providing a first rotational element 110a attached to an earstem 30, the first rotational element 110a comprising a first channel 112a configured to receive a hub 120; providing a second rotational element 110b attached to a front portion 20 (e.g., a temple 35) of an eyeglass frame or lens 50, the second rotational element 110b comprising a second channel 112b configured to receive the hub 120; positioning the first rotational element 110a and the second rotational element 110b to be substantially aligned about a pivot axis 500; positioning the hub 120 such that it is received by the first and second channels 112a, 112b.

In some embodiments, a resistance element 130 can be supported with the earstem 30 such that the resistance element 130 applies a force against the second rotational element 110b to provide a rotational resistance between the first and the second rotational elements 110a, 110b when the first and the second rotational elements 110a, 110b are rotated with respect to each other about a pivot axis 500. The supporting step can comprise inserting the resistance element 130 into a third channel 31 extending distally from a proximal end of the earstem 30.

In some embodiments, the method further comprises forming a flange 126 in an end of the hub and engaging the flange with a corresponding surface 116a of the first rotational element 110a.

In some embodiments, the positioning the hub step comprises inserting a first hub portion 120a into a first end of at least one of the first and second channels 112a, 112b in a first direction, and inserting a second hub portion 120b into a second end of at least one of the first and second channels 112a, 112b, in a second direction, wherein the second direction is approximately opposite to the first direction, and connecting the first and second hub portions 120a, 120b to each other.

Although certain preferred embodiments and examples have been discussed herein, it will be understood by those skilled in the art that the present inventions extends beyond the specifically disclosed embodiments to other alternative embodiments and/or uses of the inventions and obvious modifications and equivalents thereof. In addition, while a number of variations of the inventions have been shown and described in detail, other modifications, which are within the scope of this inventions, will be readily apparent to those of skill in the art based upon this disclosure. It is also contemplated that various combinations or sub-combinations of the specific features and aspects of the embodiments may be made and still fall within the scope of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, but should be determined only by a fair reading of the present disclosure, including the appended claims.

What is claimed is:

1. An eyewear with a front portion and two earstems, each earstem being joined to the front portion by a respective hinge, the eyewear comprising:
    a plurality of hubs, each hub comprising a cylindrical tubular body with a sidewall extending between a pair of openings to form an inner hub channel;
    each respective lateral side of the eyewear comprising:
        a first rotational element that receives one of the plurality of hubs wherein a top surface of the hub is in a flush or recessed position relative to a top surface of the first rotational element, the first rotational element attached to one of the earstem or the front portion of the eyewear;
        a second rotational element that receives the hub, the second rotational element attached to the other of the earstem or the front portion of the eyewear, the first rotational element and the second rotational element being pivotable with respect to each other about the hub; and
        a third rotational element that receives the hub wherein a bottom surface of the hub is in a flush or recessed position relative to a bottom surface of the third rotational element, the third rotational element attached to the earstem or the front portion of the eyewear to which the first rotational element is attached;
        a biasing mechanism comprising a rounded member that applies a force against a notch to provide rotational resistance during pivoting of the front portion of the eyewear with respect to one of the plurality of earstems of the eyewear;
    wherein each respective hub, first rotational element, second rotational element, third rotational element, and biasing mechanism together form the respective hinge of the eyewear;
    wherein in each respective hinge of the eyewear, the sidewall of the hub comprises upper and lower edges, and first and second retaining portions at opposed ends of the hub, wherein the retaining portions comprise inner and outer surfaces, the outer surface of the first retaining portion at the upper edge of the hub being vertically aligned with the outer surface of the second retaining portion at the lower edge of the hub, and the inner surface of the first retaining portion at the upper edge of the hub being vertically aligned with the inner surface of the second retaining portion at the lower edge of the hub, the retaining portions axially retaining the hub through an interference fit between the first retaining portion and the first rotational element without a pin received in the inner hub channel, and between the second retaining portion and the third rotational element, wherein a third portion of the hub between the first retaining portion and the second retaining portion is configured to be received by and form a clearance fit with the second rotational element.

2. The eyewear of claim 1, wherein the biasing mechanism is supported by the earstem.

3. The eyewear of claim 1, wherein the biasing mechanism of each earstem comprises a spring.

4. The eyewear of claim 2, wherein the third rotational element of each earstem is configured to attach to the earstem such that the second rotational element can be positioned between the first and third rotational element, wherein the biasing mechanism is supported by a portion of the earstem between the first and third rotational element.

5. The eyewear of claim 2, wherein the second rotational element of each earstem comprises a stop configured to engage with a distal end of the biasing mechanism, the stop defining an open or folded position of the earstem with respect to the front portion.

6. The eyewear of claim 1, wherein the rounded member of each biasing mechanism comprises a cam configured to guide the biasing mechanism along a surface of the second rotational element to the notch.

7. The eyewear of claim 5, wherein the stop of each second rotational element comprises a notch extending into a surface of the second rotational element.

8. The eyewear of claim 1, wherein a distal end of the biasing mechanism of each earstem comprises a ball bearing.

9. The eyewear of claim 1, wherein the notch of the second rotational element of each earstem comprises a biasing surface against which the biasing mechanism of each earstem cooperates to provide an increasing degree of resistance to hyperextension of each earstem from the open or folded position.

10. An eyewear comprising:
- a substantially rigid hub comprising a tubular body with a sidewall extending between a pair of openings to form an inner hub channel, the sidewall comprising inner and outer surfaces and upper and lower regions, the sidewall flaring outwardly along both the inner and outer surfaces in both the upper and lower regions of the sidewall of the hub such that the outer surface of the sidewall at an upper edge of the hub is vertically aligned with the outer surface of the sidewall at a lower edge of the hub, and the inner surface of the sidewall at an upper edge of the hub is vertically aligned with the inner surface of the hub at a lower edge of the hub;
- a first rotational element that receives the hub, the first rotational element attached to one of an earstem or a front portion of an eyewear frame or lens, wherein a top surface of a first end of the hub is flush or recessed with respect to a top surface of the first rotational element;
- a second rotational element that receives the hub, the second rotational element attached to the other of the earstem or the front portion of the eyewear frame or lens;
- a third rotational element that receives the hub, the third rotational element attached to the earstem or the front portion of the eyewear frame or lens to which the first rotational element is attached, wherein a bottom surface of a second end of the hub is flush or recessed with respect to a bottom surface of the third rotational element;
- the first and third rotational elements being pivotable with respect to the second rotational element pivotable about the hub; and
- wherein the upper and lower regions of the hub comprise first and second retaining portions that retain the first and the third rotational elements with respect to the second rotational element when the hub is received by the first, second, and third rotational elements without a pin received in the inner hub channel.

11. The eyewear of claim 10, wherein the first retaining portion and the second retaining portion are configured to respectively retain the first and the third rotational elements through a respective interference fit, and wherein there is a clearance fit between the second rotational element and the hub.

12. The eyewear of claim 10, wherein the second rotational element comprises a first stop configured to engage with a distal end of a resistance element, the first stop comprising an open or folded position of the earstem with respect to the front portion.

13. The eyewear of claim 12, wherein the first stop comprises a notch in a surface of the second rotational element.

14. The eyewear of claim 12, wherein the distal end of the resistance element comprises a ball bearing.

15. The eyewear of claim 10, wherein a biasing mechanism comprises a resilient element that acts against a biasing surface to provide an increasing degree of resistance to hyperextension of the earstem from an open or folded position.

16. A hinged eyewear, comprising:
- a front portion of the eyewear comprising an eyewear frame or lens; at least one earstem;
- a substantially rigid hub comprising a cylindrical tubular body with a sidewall extending between a pair of openings to form an inner hub channel;
- a first rotational element that receives the hub wherein a top surface of the hub is in a flush or recessed position with respect to a top surface of the first rotational element, the first rotational element attached to one of the earstem or the front portion of the eyewear frame or lens;
- a second rotational element that receives the hub, the second rotational element attached to the other of the earstem or the front portion of the eyewear frame or lens;
- a third rotational element that receives the hub wherein a bottom surface of the hub is in a flush or recessed position with respect to a bottom surface of the third rotational element, the third rotational element attached to the earstem or the front portion of the eyewear frame or lens to which the first rotational element is attached; and
- wherein the hub comprises first and second retaining portions configured at its opposed ends, the retaining portions configured to axially retain the hub with respect to the first and third rotational elements, the first retaining portion comprising a first flange extending radially outwardly from a first end of the hub, the second retaining portion comprising a second flange extending radially outwardly from a second end of the hub, the first flange comprising a tapered or radiused portion configured to engage through direct contact with a portion on the first rotational element without intervening components, and the second flange comprising a tapered or radiused portion configured to engage through direct contact with a portion of the third rotational element without intervening components, wherein the hub is axially retained within the first rotational element without a pin extending through the inner hub channel.

* * * * *

UNITED STATES PATENT AND TRADEMARK OFFICE
CERTIFICATE OF CORRECTION

| | | |
|---|---|---|
| PATENT NO. | : 8,875,346 B2 | Page 1 of 1 |
| APPLICATION NO. | : 13/171290 | |
| DATED | : November 4, 2014 | |
| INVENTOR(S) | : Jonathan Thompson | |

It is certified that error appears in the above-identified patent and that said Letters Patent is hereby corrected as shown below:

In the Specification

In column 12 at line 7, Change "foam" to --form--.

In column 16 at line 17, Change "aim" to --arm--.

In the Claims

In column 21 at line 30, In Claim 10, after "element" delete "pivotable".

Signed and Sealed this
Ninth Day of June, 2015

Michelle K. Lee
*Director of the United States Patent and Trademark Office*